INVENTORS.
ALEXANDER HING MARK,
JOSEPH NECAS &
JERZY M. BRZUSTOWSKI
BY Wolfe, Hubbard, Voit & Osann
ATTORNEYS.

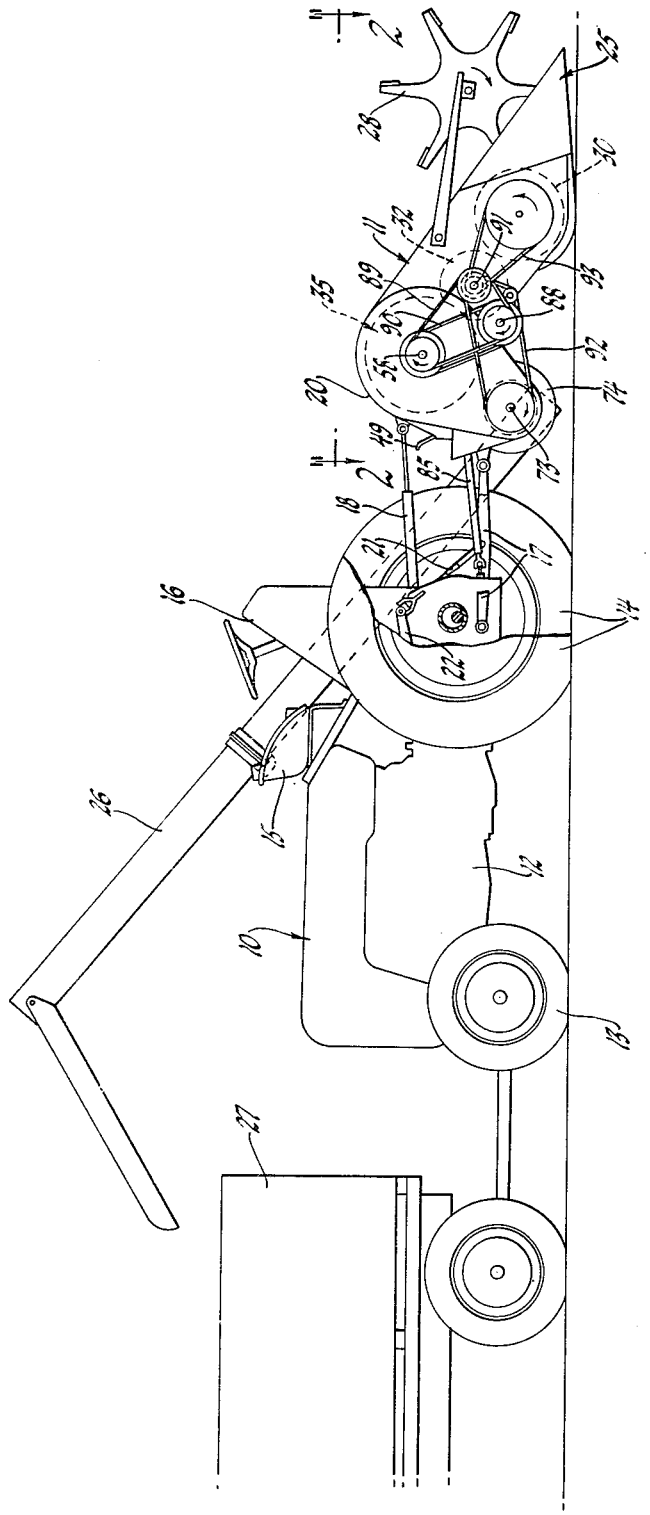

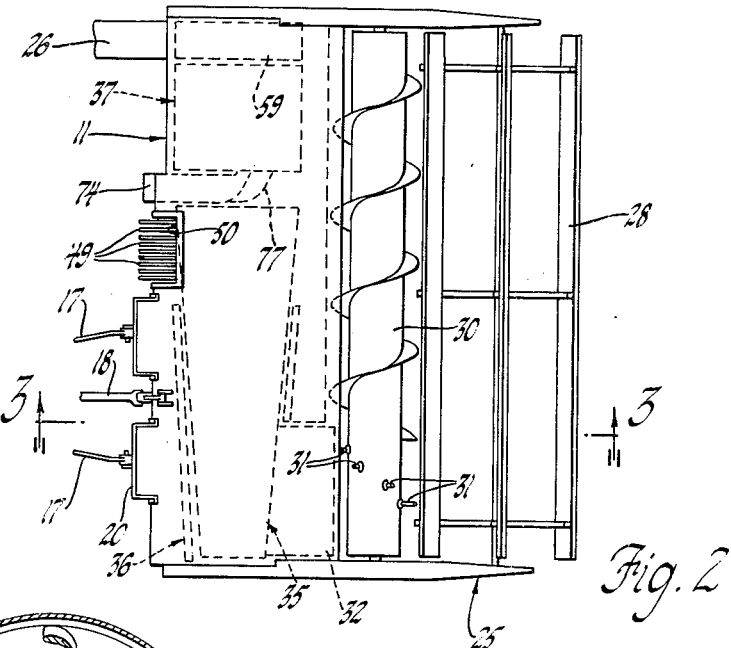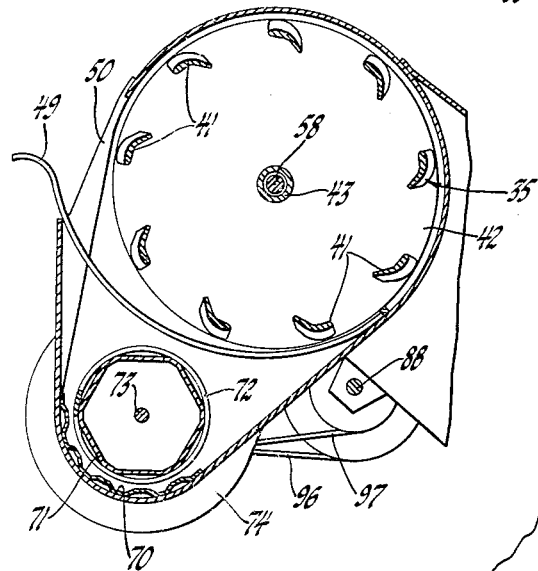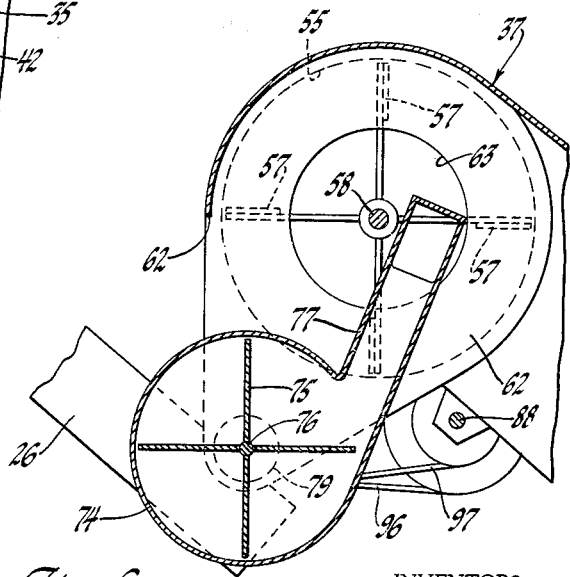

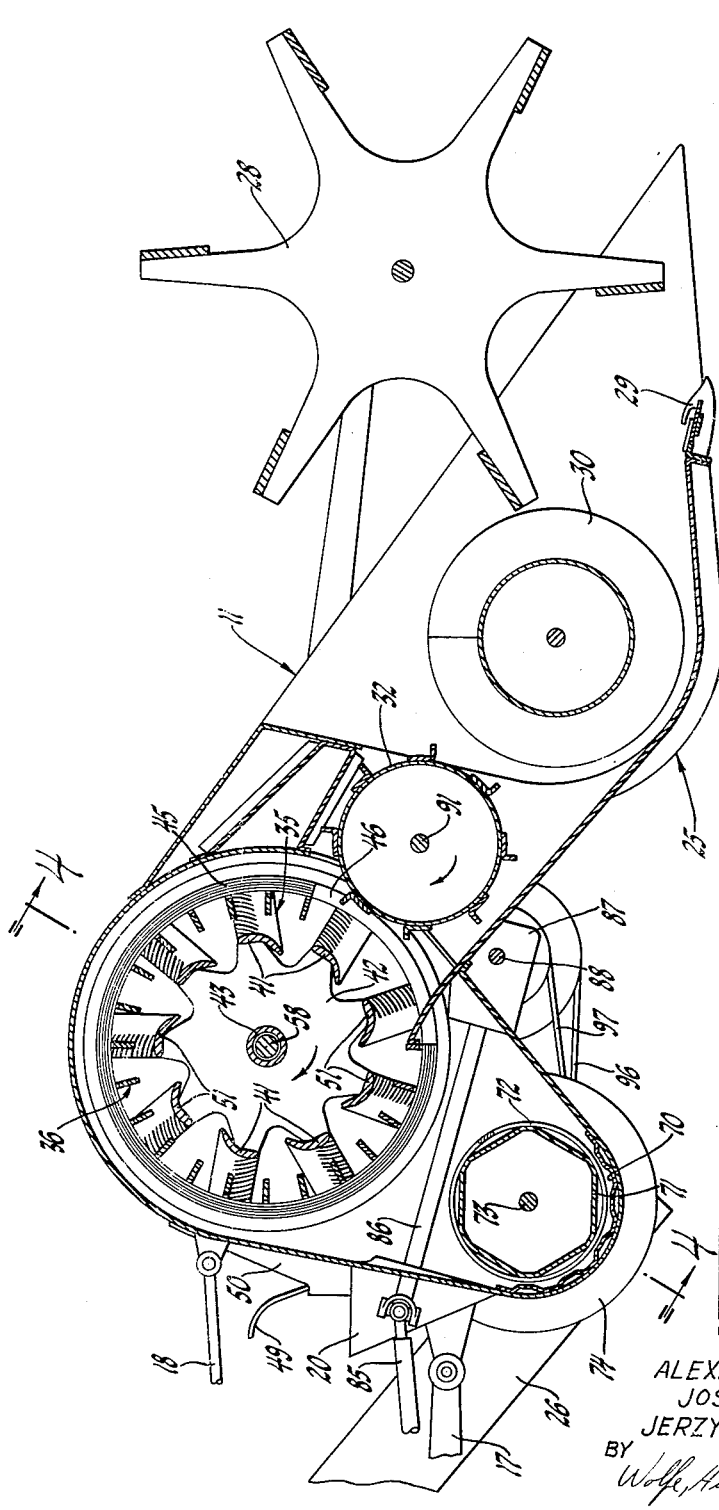

United States Patent Office 3,212,243
Patented Oct. 19, 1965

3,212,243
COMPACT COMBINE
Alexander Hing Mark, Livonia, Mich., Joseph Necas, Toronto, Ontario, and Jerzy M. Brzustowski, Toronto, Ontario, Canada, assignors to Massey-Ferguson Limited, Toronto, Ontario, Canada, a corporation of Canada
Filed Sept. 7, 1962, Ser. No. 222,036
7 Claims. (Cl. 56—21)

This invention relates generally to agricultural combines and concerns, more particularly, a combine that is exceptionally compact as compared to conventional machines.

Conventional modern agricultural combines, even those which are self-propelled, are large heavy machines which are difficult to maneuver, require considerable storage space, and often represent a substantial investment on the part of the farmer. As a result, the advantages of combine harvesting are not usually available to the small scale farmer or the farmer having small fields to harvest.

Pull type combines, i.e., those mounted on and driven by a tractor, are less expensive than the self-propelled type and are normally available in smaller sizes. However, the conventional pull type combine is mounted at the side of the tractor, which inherently results in grain loss when opening up a field and which makes efficient field splitting or block-by-block combining impractical.

The invention lies in a combine having an elongated threshing and separating cylinder with a cooperating concave and grate assembly, a rotary grain cleaning mechanism with a peripheral screen and a central axis in substanital axial alinement with the cylinder, and means for feeding harvested material to one end of the cylinder, rotating the cylinder to drive harvested material in a generally helical path toward the opposite end of the cylinder, carrying grain and chaff passing through the concave and grate assembly to the cleaning mechanism, and delivering grain passing through the cleaning mechanism screen at one side of the combine. In the preferred construction, the cylinder and cleaning mechanism are disposed transversely of the combine, and a harvesting table is mounted in front of the cylinder and cleaning mechanism with a cross auger for feeding harvested material transversely to the end of the cylinder receiving the material for threshing. The invention also contemplates mounting a combine having a harvesting table and threshing, separating and cleaning mechanisms on the hitch linkage of a tractor so that the table faces away from the tractor, and providing an elevator on the combine for delivering clean grain to a wagon hitched at the opposite end of the tractor.

An example of the inventive combine is shown in the accompanying drawings, in which:

FIGURE 1 is an elevation partly in section of a combine embodying the invention mounted on a tractor with a portion of one wheel broken away and which is shown drawing a fragmentarily illustrated wagon;

FIG. 2 is a fragmentary plan, slightly enlarged, of the combine shown in FIG. 1 and is taken along the line 2—2 in FIG. 1;

FIG. 3 is an enlarged section taken approximately along 3—3 in FIG. 2;

Figure 4:
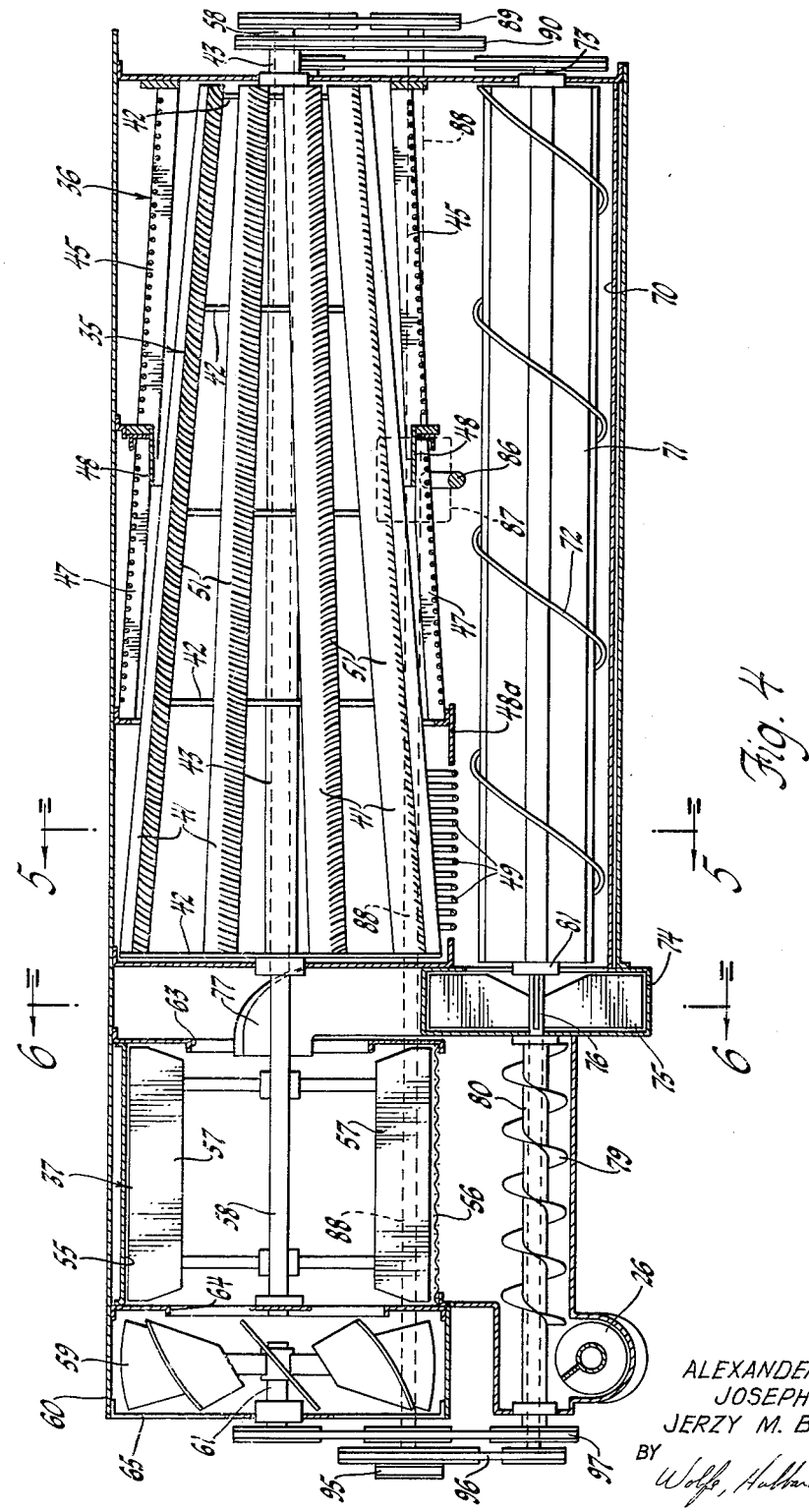

FIG. 4 is a transverse section taken approximately along the line 4—4 in FIG. 3; and FIGS. 5 and 6 are fragmentary sections taken respectively along the lines 5—5 and 6—6 in FIG. 4.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIG. 1, there is shown a tractor 10 and a combine 11 combination embodying the invention in which the combine is supported cantilever fashion on the implement hitch linkage of the tractor. The tractor 10 is preferably of the standard reverse drive type and includes a body 12 supported on steerable wheels 13 and drive wheels 14. The tractor also includes an operator's seat 15 and controls 16 which are reversed end-to-end so that the tractor, when moving in a forward direction, moves from left to right as seen in FIG. 1.

The tractor hitch linkage includes the usual draft links 17 and a top control link 18 which are pivotally secured to bracket-defining portions of a frame 20 that constitutes the body of the combine 11. The draft links 17 are elevatable under hydraulic power in the usual manner by being coupled through drop links 21 to rockable lift arms 22, of which only one is shown. The operator of the tractor 10 can selectively rock the lift arms 22 under hydraulic power in the usual way so as to elevate or lower the hitch links 17, 18 and thus raise or lower the combine 11.

The combine 11 includes a harvesting table 25 facing away from the tractor 10 and threshing, separating and cleaning mechanisms embodied within the frame 20 which are effective to deliver harvested grain at the left side of the combine as seen from the tractor's driver's seat 15. An auger elevator 26 is disposed at the left side of the combine and is extended back and up so as to deliver the harvested grain to a wagon 27 hitched at the opposite end of the tractor 10.

The harvesting table 25 includes a reel 28 overlying a reciprocating cutter bar assembly 29, which cuts the material being harvested, and a cross auger 30 which feeds the harvested material transversely across the harvesting table 25 toward the right side of the combine frame 20. A plurality of fingers 31 (see FIG. 2) and a rotary conveyor 32 (see FIG. 3) are effective to feed the harvested material rearwardly and upwardly from the table 25 to the threshing, separating and cleaning mechanisms of the combine.

Pursuant to the invention, the threshing, separating and cleaning mechanisms of the combine 11 include an elongated cylinder 35 journalled transversely in the frame 20 that cooperates with a concave and grate assembly 36 closely fitted about the cylinder, and a rotary grain cleaning mechanism 37 having a central axis that is substantially alined with the axis of the cylinder 35. The threshing and separating mechanism comprising the cylinder 35 and the concave and grate assembly 36, together with the rotary grain cleaning mechanism 37, are journalled transversely of the combine frame 20 so as to lie to the rear of, and generally parallel with respect to, the table 25 and its cross auger 30.

The cylinder 35 includes a plurality of peripherally spaced rasp bars 41 which are supported by hub plates 42 secured to a central sleeve 43. The rasp bars 41 are positioned so that the cylinder 35 defines a generally conical structure.

The concave and grate assembly 36 includes a fixed portion 45 having a peripheral opening 46 adjacent the rotary conveyor 32 (see FIG. 3) allowing harvested material to be fed to the cylinder 35. The assembly 36 also includes an axially shiftable conical portion 47 disposed coaxially with respect to the portion 45 and mounted for axial shifting movement on a cylindrical portion 48 of the combine frame 20 at one end and within a cylindrical portion 48a of the combine frame at the opposite end. It will be seen that the concave and grate assembly portions 45, 47 closely embrace the cylinder 35 and that axial shifting movement of the portion 47 permits an adjustment of the clearance between the cylinder and that portion of the assembly. The assembly 36 also includes a grate defined by a plurality of arcuate fingers 49 (see particularly FIG. 5). The fingers 49 extend rearwardly of the combine through a straw discharging opening 50.

In operation, harvested material fed through the opening 46 is engaged by the rotatably driven cylinder 35 so as to thresh the grain against the concave and grate assembly portions 45, 47. The conical configuration of the cylinder 35, together with the helical disposition of a plurality of grooves 51 formed on the rasp bars 41, are effective to drive the harvested material in a generally helical path about the axis of the cylinder 35. Much of the threshed grain and accompanying chaff fall through the concave and grate assembly portions 45, 47 while the remaining straw is moved axially toward the center of the combine. The straw is thereafter discharged rearwardly through the opening 50, and the remaining grain and chaff passes between the fingers 49 as an incident to discharge of the straw.

The rotary grain cleaning mechanism 37 includes a cylindrical chamber 55 with a peripheral screen 56 surrounding a plurality of paddle elements 57 which are mounted on a shaft 58 that passes through the sleeve 43 and is journalled in the frame 20 of the combine. A blower fan 59 is arranged coaxially of the chamber 55 within a cylindrical chamber 60. The fan is journalled on a stub shaft 61 and is driven so as to pull air successively through openings 62 in the combine frame (see FIG. 6), a cleaning mechanism intake opening 63 in the chamber 55, a cleaning mechanism discharge opening 64 and, finally, through a frame discharge opening 65. The blower fan 59 thus develops an air blast which moves axially through the cylindrical grain cleaning mechanism 37 so as to carry the chaff being agitated within the chamber through the discharge openings 64, 65 and out of the combine. Thus, the grain is thrown centrifugally through the peripheral screen 56 while the lighter chaff and foreign material is blown laterally from the combine.

To carry grain and chaff from the threshing and separating mechanism to the cleaning mechanism, a trough 70 is formed beneath the cylinder 35 and an auger 71 is journalled within the combine frame along the trough 70. In the illustrated construction, the auger 71 is defined by an hexagonal body carrying a helically wound wire 72 and being journalled on a shaft 73. The auger 71 feeds grain transversely of the combine toward a cylindrical chamber 74 containing an impeller 75 mounted on a shaft 76. The impeller is effective to throw the grain and chaff upwardly through a chute 77 and into the cleaning mechanism chamber 55 through the opening 63.

To deliver the cleaned grain, a clean grain auger 79 is mounted on a sleeve 80 beneath and parallel to the peripheral screen 56 in the grain cleaning mechanism 37. The auger 79 is effective to deliver the grain falling through the screen 56 to the elevator auger 26. It will be noted that the auger 71, impeller 75 and the auger 79 are all mounted coaxially within the combine frame with the sleeve 80 being fitted on the impeller shaft 76 and the end of the shaft 76 being alined with the end of the shaft 73 in a bearing 81.

For driving the combine elements, universally coupled p. t. o. shafts 85 and 86 are extended between the tractor 10 and a gear box 87 which connects the p. t. o. of the tractor to a transversely extending drive shaft 88 journalled along the underside of the combine frame. The drive shaft 88 extends laterally from either side of the combine frame and carries a plurality of pulleys which power the respective combine elements. Looking first at the right side of the combine as seen from the tractor's driver's seat, a belt 89 couples the drive shaft to the shaft 58 which carries the cleaning mechanism paddle elements 57. A belt 90 connects the drive shaft 88 to the sleeve 43 which supports the threshing cylinder 35. The belt 89 also drives a shaft 91 that carries the rotary conveyor 32 and which also drives, through a belt 92, the shaft 73 carrying the auger 71. Another belt 93 is extended from the shaft 91 forwardly so as to power the cross auger 30.

At the opposite or left side of the combine, the drive shaft 80 drives the harvesting table reel and cutting mechanism through a belt 95. A belt 96 drives the impeller shaft 76, and a belt 97 drives both the clean grain auger sleeve 80 and the stub shaft 61 which carries the fan or blower 59. It can thus be seen that because of the parallel and axially alined relationship of the various combine elements, a particularly compact and efficient drive is made possible.

The embodiments of the invention in which an exclusive property or privilege is claimed are defined as follows:

1. In a combine, the combination comprising a frame, an elongated threshing and separating cylinder journalled in said frame, a concave and grate assembly closely fitted about said cylinder and having a peripheral opening allowing harvested material to be fed to one end of said cylinder, means for rotating said cylinder and driving harvested material axially from said one end of the cylinder in a generally helical path toward the opposite end of the cylinder, a rotary grain cleaning mechanism having a central axis and a peripheral screen, said cleaning mechanism being mounted in said frame in substantial axial alinement with and at said opposite end of the cylinder, first means for carrying grain and chaff pasing through said concave and grate assembly to said cleaning mechanism, and second means for delivering grain passing through said screen at one side of said frame.

2. The combination of claim 1 in which said first means includes an auger conveyor paralleling said cylinder and an impeller for throwing grain from said auger conveyor to sad cleaning mechanism, and said second means includes an auger conveyor paralleling said rotary cleaning mechanism.

3. The combination of claim 2 in which each of said auger conveyors and said impeller are all mounted coaxially.

4. A combine comprising, in combination, a frame, a harvesting table for harvesting a standing crop mounted on said frame, said table including a cross auger for feeding harvested material transversely to one side of said frame, an elongated threshing and separating cylinder journalled transversely in said frame, a concave and grate assembly closely fitted about said cylinder and having a peripheral opening at said side of the frame, means for feeding harvested material from said cross auger through said peripheral opening to one end of said cylinder, and a grain cleaning mechanism being mounted in said frame in substantial alinement with and at said opposite end of the cylinder.

5. A combine comprising, in combination, a frame, a harvesting table for harvesting a standing crop mounted on said frame, said table including a cross auger for feeding harvested material transversely to one side of said frame, an elongated threshing and separating cylinder journalled transversely in said frame, a concave and grate assembly closely fitted about said cylinder and having a peripheral opening at said side of the frame, means for feeding harvested material from said cross auger through said peripheral opening to one end of said cylinder, means for rotating said cylinder and driving harvested material axially from said one end of said cylinder in a generally helical path, a grain cleaning mechanism being mounted in said frame in substantial alinement with and at said opposite end of the cylinder, first means for carrying grain and chaff passing through said concave and grate assembly to said cleaning mechanism, and second means for delivering grain from said cleaning mechanism to one side of said frame.

6. In combination with a tractor having a hitch linkage at one end and a wagon secured to the tractor, a combine secured to said hitch linkage and having a harvester table facing away from said combine, said combine having threshing, separating and cleaning mechanisms effective to deliver harvested grain at one side of said combine, said threshing and separating mechanism including an elongated cylinder journalled transvesely in said combine and a concave and grate assembly closely fitted about the cylinder with a peripheral opening allowing harvested material to be fed from said table to said cylinder, and an elevator on said combine for delivering grain from said combine side to said wagon.

7. The combination of claim 6 in which the cleaning mechanism is a rotary grain cleaning mechanism having a central axis and a peripheral screen, and said cleaning mechanism being disposed in substantial axial alinement with said cylinder and behind said table.

References Cited by the Examiner

UNITED STATES PATENTS

| | | | |
|---|---|---|---|
| 990,007 | 4/11 | Reason | 130—22 |
| 2,050,631 | 8/36 | Schlayer | 130—27 |
| 2,528,275 | 10/50 | Heth | 56—21 |
| 2,670,582 | 3/54 | Hyman | 56—21 |
| 2,811,004 | 7/58 | Borrow | 56—24 |

ANTONIO F. GUIDA, *Primary Examiner.*

CARL W. ROBINSON, T. GRAHAM CRAVER,
*Examiners.*